(12) United States Patent
Mejia et al.

(10) Patent No.: US 11,830,099 B2
(45) Date of Patent: Nov. 28, 2023

(54) MACHINE LEARNING MODELING FOR PROTECTION AGAINST ONLINE DISCLOSURE OF SENSITIVE DATA

(71) Applicant: Adobe Inc., San Jose, CA (US)

(72) Inventors: Irgelkha Mejia, Round Rock, TX (US); Ronald Oribio, Austin, TX (US); Robert Burke, Austin, TX (US); Michele Saad, Austin, TX (US)

(73) Assignee: Adobe Inc., San Jose, CA (US)

( * ) Notice: Subject to any disclaimer, the term of this patent is extended or adjusted under 35 U.S.C. 154(b) by 352 days.

(21) Appl. No.: 17/093,175

(22) Filed: Nov. 9, 2020

(65) Prior Publication Data

US 2022/0148113 A1 May 12, 2022

(51) Int. Cl.
*G06Q 10/10* (2023.01)
*G06Q 10/06* (2023.01)
*G06Q 30/06* (2023.01)
*G06Q 30/02* (2023.01)
*G06Q 40/08* (2012.01)
*G06Q 50/26* (2012.01)
(Continued)

(52) U.S. Cl.
CPC ........... *G06Q 50/265* (2013.01); *G06F 16/48* (2019.01); *G06F 21/6245* (2013.01); *G06F 40/40* (2020.01); *G06N 3/08* (2013.01); *G06Q 10/0635* (2013.01); *G06Q 10/10* (2013.01); *G06Q 50/01* (2013.01); *G06F 3/0482* (2013.01)

(58) Field of Classification Search
CPC .. G06Q 50/265; G06Q 10/0635; G06Q 10/10; G06Q 50/01; G06F 16/48; G06F 21/6245; G06F 40/40; G06F 3/0482; G06F 40/295; G06F 40/174; G06F 40/216; G06N 3/08; G06N 3/0454; G06N 20/00; G06N 3/084
USPC .................................................. 705/1.1–912
See application file for complete search history.

(56) References Cited

U.S. PATENT DOCUMENTS

2012/0250951 A1* 10/2012 Chen ....................... G06Q 50/01
382/118
2017/0353423 A1* 12/2017 Morrison ............ G06F 3/04842
(Continued)

OTHER PUBLICATIONS

Examination Report received for GB Application No. 2111521.7 dated Jan. 18, 2022, 7 pages.

*Primary Examiner* — Jonathan P Ouellette
(74) *Attorney, Agent, or Firm* — Kilpatrick Townsned & Stockton LLP

(57) ABSTRACT

Systems and methods use machine learning models with content editing tools to prevent or mitigate inadvertent disclosure and dissemination of sensitive data. Entities associated with private information are identified by applying a trained machine learning model to a set of unstructured text data received via an input field of an interface. A privacy score is computed for the text data by identifying connections between the entities, the connections between the entities contributing to the privacy score according to a cumulative privacy risk, the privacy score indicating potential exposure of the private information. The interface is updated to include an indicator distinguishing a target portion of the set of unstructured text data within the input field from other portions of the set of unstructured text data within the input field, wherein a modification to the target portion changes the potential exposure of the private information indicated by the privacy score.

18 Claims, 9 Drawing Sheets

(51) Int. Cl.
  *G06F 16/48*   (2019.01)
  *G06F 40/40*   (2020.01)
  *G06F 21/62*   (2013.01)
  *G06N 3/08*   (2023.01)
  *G06Q 10/0635*  (2023.01)
  *G06Q 50/00*   (2012.01)
  *G06F 3/0482*   (2013.01)

(56)       References Cited

U.S. PATENT DOCUMENTS

| | | | |
|---|---|---|---|
| 2018/0285599 A1* | 10/2018 | Praveen | G06F 18/23 |
| 2020/0336501 A1* | 10/2020 | Lewis | H04L 63/1416 |
| 2022/0027508 A1* | 1/2022 | Rao | G06F 16/219 |

\* cited by examiner

MACHINE LEARNING MODELING FOR PROTECTION AGAINST ONLINE DISCLOSURE OF SENSITIVE DATA

TECHNICAL FIELD

This disclosure generally relates to using artificial intelligence to prevent inadvertent disclosure of sensitive data. More specifically, but not by way of limitation, this disclosure relates to techniques for using machine learning models with content editing tools to prevent or mitigate, in real time, inadvertent disclosure and dissemination of sensitive data.

BACKGROUND

Artificial intelligence techniques for processing text are useful in a variety of content editing tools. As an example, machine learning models are used to predict a next word as a user enters content for an online search. As another example, machine learning is used in online word processing software to suggest changes to improve readability of text content.

However, these types of content editing tools often present a risk that sensitive information, such as personally identifying information, could be inadvertently disclosed. For instance, a user could enter seemingly innocuous information into an online forum, such as noting that the user is a "software engineer from Florida," that could be used in combination with other online content to identify the user. In some cases, the online nature of certain content editing tools presents unique risks of allowing this sensitive data, once inadvertently disclosed, to be rapidly disseminated, sometimes irrevocably. As the amount of information posted to the Internet by individuals rapidly increases, so do privacy concerns due to the exposure of personally identifying information. Seemingly innocent data elements when aggregated can provide a complete view of someone that they never intended to release or realized was available through their interactions with the internet.

SUMMARY

Certain embodiments involve techniques for using machine learning models to flag potential privacy breaches in real time.

In some aspects, a computer-implemented method comprises detecting, by a content retrieval subsystem, entry of a set of unstructured text data entered into an input field of a graphical interface; identifying, responsive to detecting the entry and with a natural language processing subsystem, a plurality of entities associated with private information by at least applying a trained machine learning model to the set of unstructured text data in the input field; computing, by a scoring subsystem, a privacy score for the text data by identifying connections between the entities, the connections between the entities contributing to the privacy score according to a cumulative privacy risk, the privacy score indicating potential exposure of the private information by the set of unstructured text data; and updating, by a reporting subsystem, the graphical interface to include an indicator distinguishing a target portion of the set of unstructured text data within the input field from other portions of the set of unstructured text data within the input field, wherein a modification to the target portion changes the potential exposure of the private information indicated by the privacy score.

In some aspects, the method further comprises detecting, by the content retrieval subsystem, modification to the set of unstructured text data entered into the input field of the graphical interface; identifying, responsive to detecting the modification and with the natural language processing subsystem, a modified plurality of entities associated with private information by at least applying the trained machine learning model to the modified text data in the input field; computing, by the scoring subsystem, a modified privacy score for the text data based on the modified entities; and updating, by a reporting subsystem, the graphical interface based on the modified privacy score.

In some aspects, the method further comprises receiving, by the content retrieval subsystem, an image or video in association with the unstructured text data; and processing, by a media processing subsystem, the image or video to identify metadata, wherein at least a subset of the identified metadata is further input to the machine learning model to identify the entities.

In some aspects, the set of unstructured text data is a first set of unstructured text data and the plurality of entities is a first plurality of entities, and the method further comprises, before receiving the first set of unstructured text data, detecting, by the content retrieval subsystem, entry of a second set of unstructured text data entered into the input field; and identifying, responsive to detecting the entry and with the natural language processing subsystem, a second plurality of entities associated with the private information by at least applying the trained machine learning model to the second set of unstructured text data in the input field, wherein the scoring subsystem computes the privacy score based on connections between the first plurality of entities and the second plurality of entities. In some aspects, the updated graphical interface further displays an indication of the privacy score. In some aspects, the machine learning model includes a neural network and the method further comprising training the neural network by retrieving, by a training subsystem, first training data for a first entity type associated with privacy risk from a first database; retrieving, by the training subsystem, second training data for a second entity type associated with privacy risk from a second database; and training, by the training subsystem, the neural network to identify the first entity type and the second entity type using the first training data and the second training data.

In some aspects, the method further comprises determining, by the natural language processing subsystem, entity types for the identified entities and, based on the determined entity types, assigning, by the scoring subsystem, weights to links between entities in a graph model, wherein the privacy score is based on the weights.

In some aspects, a computing system comprises a content retrieval subsystem configured to detect entry of unstructured text data into an input field of a graphical interface; a natural language processing subsystem configured to identify a plurality of entities associated with private information by at least applying a trained machine learning model to unstructured text data; a scoring subsystem configured to compute a privacy score for the text data by applying a graph model to the plurality of entities to identify connections between the entities, the connections between the entities contributing to the privacy score according to a cumulative privacy risk, the privacy score indicating potential exposure of the private information by the unstructured text data; and a reporting subsystem configured to update the graphical interface to include an indicator distinguishing a target portion of the unstructured text data within the input field from other portions of the unstructured text data within the input field, the target portion causing the potential exposure of the private information indicated by the privacy score.

In some aspects, a non-transitory computer-readable medium has instructions stored thereon, the instructions executable by a processing device to perform operations comprising detecting entry of a set of unstructured text data entered into an input field of a graphical interface; a step for computing a privacy score for the text data indicating potential exposure of private information by the set of unstructured text data; and updating, based on the privacy score, an indicator distinguishing a target portion of the set of unstructured text data within the input field from other portions of the set of unstructured text data within the input field.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

DETAILED DESCRIPTION

Figure 1:
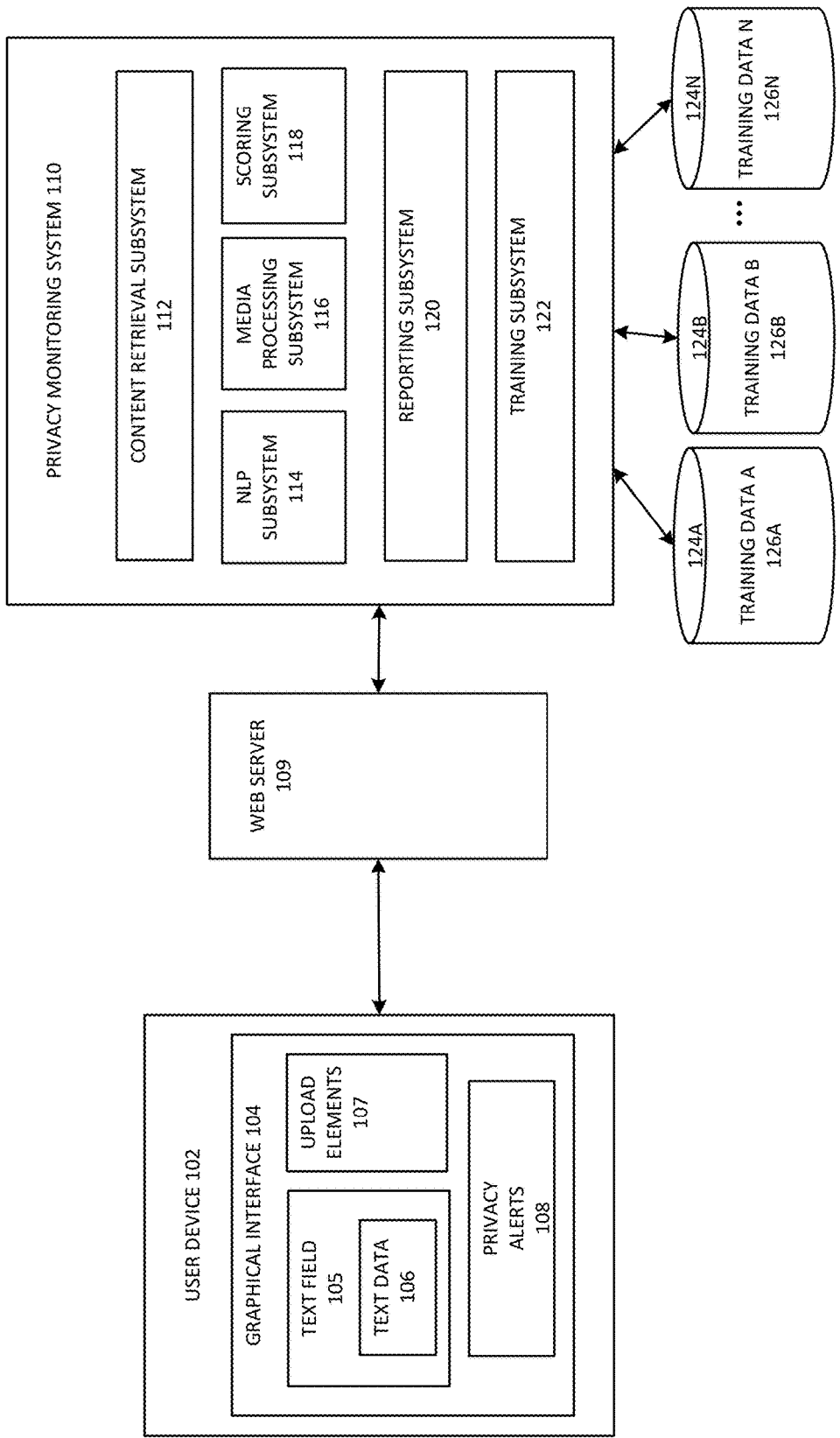
FIG. 1 depicts an example of a computing environment in which content editing tools use machine learning models to indicate content modifications for addressing potential privacy breaches in real time, according to certain embodiments of the present disclosure.

The present disclosure includes systems and methods for using machine learning models with content editing tools to prevent or mitigate, in real time, inadvertent disclosure and dissemination of sensitive data. As explained above, online services and other content editing tools present a risk of inadvertently disclosing sensitive data that can be rapidly disseminated via the Internet or other data networks. Certain embodiments described herein address this risk by using machine learning models to detect potentially problematic content during an editing phase and indicate potential modifications to the content that would reduce the disclosure of sensitive data. For instance, such embodiments analyze unstructured text data to identify words or phrases associated with private information. A privacy score is generated based on connections between these words or phrases, and, based on the privacy score, information is displayed which can encourage a user to modify the text data to mitigate the exposure of private information.

The following non-limiting example is provided to introduce certain embodiments. In this example, a privacy monitoring system is in communication with a web server that serves data for rendering a graphical interface (e.g., a graphical user interface (GUI)) on a user device.

The graphical interface includes text fields configured to receive text data. The privacy monitoring system retrieves text data as it is entered by a user, identifies elements of the text data, as well as relationships between various elements of the text data, that pose a privacy risk. For instance, the privacy monitoring system detects entry of a set of unstructured text data entered into an input field of a graphical interface. The graphical interface is used for editing and publicly posting information, such as a product review, a social media post, a classified advertisement, and so forth. The content retrieval subsystem monitors for entry of information into the input field, and, upon detecting entry of information, initiates processing of the text to identify privacy issues. Privacy issues may stem from information that exposes sensitive data, such as personally identifying information (PII), that could be used alone or in combination with other publicly accessible data to identify an individual. Examples of such sensitive data include the individual's address, city, bus stop, medical issue, and so forth.

Continuing with this example, the privacy monitoring system processes the text data to identify entities associated with private information. To do so, the privacy monitoring system applies a machine learning model to the text data. The machine learning model is a named entity recognizer trained to identify specific categories of entities that are associated with potential privacy issues, such as location information, medical information, etc. The privacy monitoring system generates a graph model of the entities, identifying connections between the entities and how the entities relate to one another, which is used to generate a privacy score indicating potential exposure of private information by the set of unstructured text data. The connections between the entities contribute to the privacy score according to a cumulative privacy risk. This can be implemented via the graph model by weighting links between different entities based on their cumulative risk—for example, divulging two pieces of location information such as city and street would result in more of a privacy breach than divulging one piece of health information and one piece of location information—e.g., that the person has asthma and lives in Dallas. Accordingly, weights in the graph model can be heavier for links between like entity types than for links between different entity types.

In this example, the privacy monitoring system computes, based on the entities in the graph and the weighted links between the entities, a privacy score that is usable for suggesting or otherwise indicating edits that would decrease the risk of sensitive data disclosure. The privacy monitoring system compares this privacy score to one or more thresholds to identify whether the text should be modified, and to identify suggested modifications (e.g., remove the name of a street from a review). Such information generated by the privacy monitoring system is output to a privacy monitoring system for reporting via the graphical interface. To facilitate editing of the text, the privacy monitoring system updates the graphical interface to include an indicator distinguishing a target portion of the set of unstructured text data (e.g., one or more entities) within the input field from other portions of the set of unstructured text data within the input field. Upon detecting modification to the target portion, the privacy monitoring system may repeat the analysis to identify an updated privacy score, and modify or remove the suggestions. Thus, the system can identify privacy issues in real time by retrieving and processing text as the text is entered by a user to generate and provide suggestions on-the-fly that can be used to help produce text content (e.g., an online post) with reduced exposure of private information or other sensitive data.

As described herein, certain embodiments provide improvements to computing environments by solving problems that are specific to online content editing tools. These improvements include providing real-time feedback in an editing tool that alerts a user to potential disclosure of sensitive data, prior to that sensitive data being published to the Internet. Online computing environments pose unique risks for this type of sensitive data exposure, as the Internet or other data networks allow for nearly instantaneous transmission and publication to a large number of recipients, whereas the utility provided by an online content editing tool (e.g., publication via the click of a single button) heightens the risk that this publication and transmission could occur accidentally. Furthermore, the wide variety of information available via the Internet limits the ability of a user to accurately determine whether any given piece of data posted in an online forum could be combined with other publicly available data to identify the user. Because these problems are specific to computing environments, embodiments described herein utilize machine-learning models and other automated models that are uniquely suited for mitigating the risk of inadvertently disseminating user data via the Internet or other data network. For instance, a computing system automatically applies various rules of a particular type (e.g., various functions captured in one or more models) to text entered into a user interface, sometimes in a real-time manner. The rules can be more effective in detecting potential disclosure of sensitive data at least because the system is trained using a large corpus of information to identify and quantify different levels of sensitive private information in text, both alone and in relation to prior posts, rather than relying on subjective judgments of a user posting the content.

Additionally or alternatively, certain embodiments provide improvements over existing software tools for securely creating online content. For instance, existing software tools require users, using an editing tool executed on a computer, to subjectively determine the level of risk associated with entering certain data into an online editing tool. Relying on these subjective determinations could decrease the utility of editing tools that are used to create online content. Embodiments described herein can facilitate an automated process for creating online content that avoids this reliance on subjective, manual determinations by a user. For instance, the combination of a machine-learning model coupled with the structural features of a user interface (e.g., suggestions or other indicators of potential edits to reduce disclosure risks) improves the functionality of an online editing tool. These features can reduce the manual, subjective effort involved with preventing the disclosure of sensitive data in existing content editing tools.

As used herein, the term "private information" is used to refer to information that could be used to identify an individual or sensitive information about that individual. For example, private information can include information that directly identifies an individual such as name, address, or social security information, as well as information that indirectly identifies the individual such as race, age, and region of residence. Certain categories of information about an individual are also private, such as medical conditions and employment information.

As used herein, the term "entity" is used to refer to a word or phrase that corresponds to a defined category or type of information. An entity can be a proper noun (e.g., "John Smith;" "124 Main Street"). An entity can also be a phrase representing a selected category of information (e.g., "bad back," "pineapple," "seven grandchildren."). Entities may fall into categories or types such as places, things, people, medical conditions, and the like. Certain entities are associated with private information, such as location information, medical information, and employment information.

As used herein, the term "privacy risk" is used to refer to a level of potential exposure of private information. The more private information, and the more sensitive the private information, the higher the privacy risk. Privacy risk may be ascertained for a single exposure (e.g., a single online post) or cumulatively (e.g., for multiple online posts).

Example of an Operating Environment for Real Time Privacy Breach Prediction

FIG. 1 depicts an example of a computing environment 100 in which content editing tools use machine learning models to indicate content modifications for addressing potential privacy breaches in real time. In the example depicted in FIG. 1, a user device 102 posts information via a web server 109. A privacy monitoring system 110 evaluates the information to identify privacy issues using a content retrieval subsystem 112, natural language processing (NLP) subsystem 114, media processing subsystem 116, and reporting subsystem 120. The subsystems include one or more trained machine learning models which are trained using a training subsystem 122 using training data 126A-126N.

The various subsystems of the privacy monitoring system 110 can be implemented in the same computing system or different, independently operated computing systems. For example, the training subsystem 122 could be a separate entity from the NLP subsystem 114, the media processing subsystem 116, and the scoring subsystem 118, or the same entity. Different, independently operating web services 109 can communicate with the privacy monitoring system 110, or the privacy monitoring system 110 can be part of the same online service as the web service. While the system of FIG. 1 can be used, other embodiments can involve the privacy monitoring system 110 being built into a software application executed on the client device 102, e.g., as a plug-in to some sort of word processing software.

Some embodiments of the computing environment 100 include a user device 102. Examples of a user device include, but are not limited to, a personal computer, a tablet computer, a desktop computer, a processing unit, any combination of these devices, or any other suitable device having one or more processors. A user of the user device 102 interacts with a graphical interface 104 by exchanging data with web server 109 and privacy monitoring system 110 via a data network.

The user device is communicatively coupled to the web server 109 and the privacy monitoring system 110 via the data network. Examples of the data network include, but are not limited to, internet, local area network ("LAN"), wireless area network, wired area network, wide area network, and the like.

The graphical interface 104 is an interface such as a GUI which is capable of displaying and receiving information. The graphical interface 104 includes a content-editing tool for receiving and modifying content (e.g., content to be posted online). The graphical interface 104 includes a text field 105 for receiving text data 106. For example, the text field 105 is an interface element configured to receive typed text data 106 from a user of the user device 102. Alternatively, or additionally, in some embodiments, the text field 105 is configured to receive text data that the system identifies by processing spoken user input (e.g., using speech-to-text processing techniques).

In some implementations, the graphical interface 104 further includes upload elements 107 by which a user can upload additional information such as images or videos. Responsive to user selection of an upload element, the graphical interface 104 transitions to a view showing available files to upload, prompt a user to take a photo, and so forth.

The graphical interface 104 is further configured to display privacy alerts 108 responsive to signals from the privacy monitoring system 110 (directly or by way of web server 109). For example, the privacy alerts 108 include information characterizing a risk associated with portions of the text data 106 (e.g., a privacy risk score, different color flags, warnings, and so forth). In some implementations, the privacy alerts 108 indicate portions of the text data 106 which are associated with a potential exposure of private information (e.g., highlighting, printing in a different color, bubbles with explanatory text, etc.). Examples of a graphical interface 104 including text fields 105, upload elements 107, and privacy alerts 108 are illustrated in FIGS. 3A-3D.

In some embodiments, the web server 109 is associated with an entity such as a social network, online merchant, or various different websites that allow users to post information. The web server 109 includes functionality to serve a website (which can include a content editing tool) and accept input for modifying the website from the user device 102 and/or privacy monitoring system 110. In some implementations, the web server 109 is a separate entity and separate computing device from the privacy monitoring system 110. Alternatively, in some implementations, the web server 109 is a component of the privacy monitoring system 110.

The privacy monitoring system 110 monitors for updated information received from the user device 102 via the graphical interface 104, and analyzes the information for privacy risk. In some embodiments, an indication of the privacy risk is then presented by updating the graphical interface 104. The privacy monitoring system 110 includes a content retrieval subsystem 112, Natural Language Processing (NLP) subsystem 114, media processing subsystem 116, scoring subsystem 118, reporting subsystem 120, and training subsystem 122. In some embodiments, the privacy monitoring system further includes, or is communicatively coupled to, one or more data storage units (124A, 124B, . . . 124N) for storing training data (training data A 126A, training data B 126B, . . . training data N 126N).

The content retrieval subsystem 112 includes hardware and/or software configured to retrieve content that a user is entering into the graphical interface 104. The content retrieval subsystem 112 is configured to retrieve unstructured text data 106 as it is entered into the text field 105 of the graphical interface 104. In some implementations, the content retrieval subsystem 112 is further configured to retrieve media such as images and videos uploaded via upload elements 107.

The NLP subsystem 114 includes hardware and/or software configured to perform natural language processing to identify entities (e.g., certain words or phrases) associated with privacy risk. In some embodiments, the NLP subsystem 114 applies a machine learning model trained to recognize entities associated with privacy risk such as health-related words or phrases, street names, city names, and so forth. Examples of phrases that could be associated with a privacy risk include:

"For our upstairs bathroom"—implies more than 1 story home
"Texas summers"—helps to triangulate a user's location
"Getting a screen reader for privacy at nearby coffee shop"—helps to triangulate a user's location
"Purchased for my son's asthma"—betrays a medical condition The media processing subsystem 116 includes hardware and/or software configured to analyze media files to identify entities. The media processing subsystem 116 is configured for processing an image or video to identify metadata and/or text within the image itself. In some aspects, the entities are identified by analyzing a media file to identify metadata (for example, including location information). Alternatively, or additionally, the media processing subsystem 116 identifies the entities by analyzing an image (e.g., to identify a word on a sign in a photograph).

The scoring subsystem 118 includes hardware and/or software configured to generate a privacy score based on the entities identified by the NLP subsystem 114 and/or identified by the media processing subsystem 116. For example, the scoring subsystem 118 generates a graph of identified entities. By factoring in weights assigned to the links between the entities, the scoring subsystem 118 generates the privacy score representative of the overall information exposure of the entities as a whole. In some aspects, the scoring subsystem further identifies suggested actions, particular words that should be removed or modified, and the like, as described herein.

The reporting subsystem 120 includes hardware and/or software configured to generate and transmit alerts to the user which can include the privacy score and other information generated by the scoring subsystem 118. The reporting subsystem 120 causes display of privacy alerts 108 to the graphical interface 104. The privacy alerts 108 include graphical displays such as text, highlighted portions of text, and the like, via the like. Alternatively, or additionally, in some implementations, the privacy alerts 108 include audio alerts such as a beep or speech output.

The training subsystem 122 includes hardware and/or software configured to train one or more machine learning models as used by the NLP subsystem 114, media processing subsystem 116, and/or scoring subsystem 118. An example training process is described below with respect to FIG. 4.

The data storage units 124A, 124B, . . . 124N can be implemented as one or more databases or one or more data servers. The data storage units 124A, 124B, . . . 124N includes training data 126A, 126B, . . . 126N that is used by the training subsystem 122 and other engines of the privacy monitoring system 110, as described in further detail herein.

Examples of Operations for Real Time Privacy Breach Prediction

Figure 2:
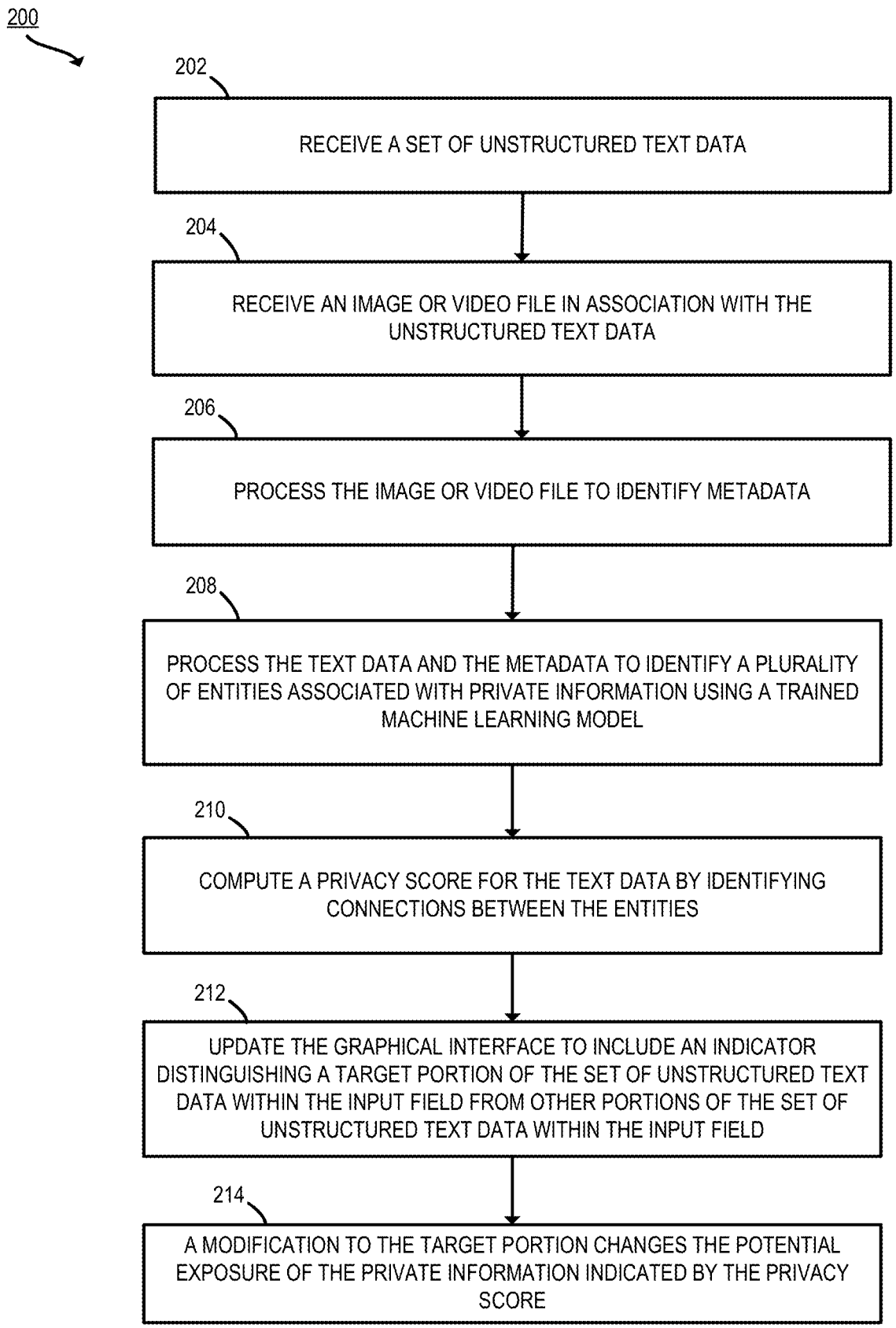
FIG. 2 depicts an example of a process for updating an interface of a content editing tool in real time to indicate potential edits that would reduce exposure of private information, according to certain embodiments of the present disclosure.

FIG. 2 depicts an example of process 200 for updating an interface of a content editing tool in real time to indicate potential edits that would reduce exposure of private information. In this example, the privacy monitoring system 110 detects input to the graphical interface 104 via the content retrieval subsystem 112. The input is processed in a pipeline including the NLP subsystem 114, scoring subsystem 118, and in some cases the media processing subsystem 116. If a portion of the input poses a risk of private information exposure above an acceptable threshold, the reporting subsystem 120 modifies the graphical interface 104 to include privacy alerts 108, which can cause the user to modify the entered information. Alternatively, or additionally, in other embodiments, the privacy monitoring system can be executed as part of a software application executed on a client device, where the software application can perform one or more of blocks 202-206, 212, and 214. In some embodiments, one or more processing devices implement operations depicted in FIG. 2 by executing suitable program code. For illustrative purposes, the process 200 is described with reference to certain examples depicted in the figures. Other implementations, however, are possible.

At block 202, the content retrieval subsystem receives a set of unstructured text data entered into an input field of the graphical interface. As a user enters text data into the graphical interface, the content retrieval subsystem detects and identifies the entered text data. The content retrieval subsystem retrieves the unstructured text data, for example, as a stream or in chunks, as the user types in text via the graphical interface. The content retrieval subsystem may retrieve the set of unstructured text data directly from the user device or via an intermediary web server.

A processing device executes program code of the content retrieval subsystem 112 to implement block 202. For example, the program code for the content retrieval subsystem 112, which is stored in a non-transitory computer-readable medium, is executed by one or more processing devices.

One or more operations in blocks 204-210 implement a step for computing a privacy score for the text data indicating potential exposure of the private information by the set of unstructured text data. In some implementations, at block 204, the content retrieval subsystem receives an image or video in association with the unstructured text data. For example, the content retrieval subsystem identifies an image or video responsive to a detecting user interacting with an "upload" button and selecting a media file stored to the user device. Alternatively, or additionally, the user captures an image or video at the time of the submission via the graphical interface.

At block 206, the media processing subsystem processes the image or video file to identify metadata. In some embodiments, the media processing subsystem extracts metadata from a received media file (e.g., a JPEG, MP4, etc.). Alternatively, or additionally, the media processing subsystem analyzes the image or video data itself to identify words. For example, an image includes the name of a street, building, or bus stop. The media processing subsystem performs optical character recognition on a picture or video still to identify any words therein. Both the metadata and the identified words can be treated by the privacy monitoring system as additional text data for use in privacy analysis.

At block 208, the NLP subsystem processes the text data to identify a plurality of entities associated with private information using a trained machine learning model. Examples of types of entities associated with privacy risk include names, streets, and local landmarks such as schools, museums, bus stops, and so forth. Other examples of entities associated with privacy risk include information about health conditions, information about familial status, and information about employment status. In some implementations, at least a subset of the metadata identified at block 206 is further input to the machine learning model to identify the entities.

In some embodiments, the NLP subsystem processes the data responsive to detecting the entry of the text data at block 202. In some implementations, the NLP subsystem further processes information identified from a media file at block 206. The NLP subsystem identifies the plurality of entities associated with the private information by at least applying a trained machine learning model to the set of unstructured text data in the input field. Alternatively, or additionally, the NLP subsystem applies the trained machine learning model to identified image metadata and/or words identified from images at block 206.

In some aspects, the trained machine learning model is a named entity recognizer which has been trained to identify certain words or categories of words associated with a privacy risk. A named entity recognizer processes text data to identify entities within the text data, and then tags the text data with information related to the identified entities. The machine learning model is trained using techniques such as those described below with respect to FIG. 4. In some implementations, the machine learning model is a neural network such as a recurrent neural network (RNN), convolutional neural network (CNN), or deep neural network. In some implementations, the machine learning model is an ensemble model (e.g., including a neural network and another type of model such as a rules-based model).

At block 210, the scoring subsystem computes a privacy score for the text data by identifying connections between the entities. In some embodiments, the scoring subsystem generates a graph model (also referred to as a graph) of entities including connections between the entities. The nodes of the graph are entities, which can include entities identified from text data at block 202, as well as entities identified from image metadata or the images themselves at block 206. The connections between the entities contribute to the privacy score according to a cumulative privacy risk. For example, the connections between different entities are weighted differently to account for the increased risk of exposing certain entities together. As a specific example, a street name and a city name together pose a relatively large cumulative privacy risk, since they can be used together to identify a location, while the combination of a medication taken and a street name have less of a cumulative privacy risk, since the entities are less related. The scoring subsystem can then generate the privacy score as a function of the number of links and the weights of those links. Accordingly, in some embodiments, the scoring subsystem determines entity types (e.g., medical condition, street, age, etc.). Using the determined entity types, the scoring subsystem assigns weights to links between entities in a graph model, wherein the privacy score is a function of the weights. The privacy score indicates potential exposure of the private information by the set of unstructured text data.

In some aspects, the scoring subsystem determines a level of sensitivity of each identified entity. In some aspects, the entities are weighted or labeled with different sensitivity categories. For example, certain entities are assigned a higher weight than other entities according to entity type. As a specific example, more specific entities are weighted more heavily than more general entities (e.g., the name of a street that the user lives on is weighted more heavily than the name of the continent in which the user lives). In some embodiments, the machine learning model is trained to recognize these sensitivity levels (e.g., using assigned labels). For example, entities related to medical, health and financial information are labeled at a highest level of sensitivity. Another set of entities can then be labeled at a medium level of sensitivity (example: those related to demographic and geolocation).

In some aspects, the scoring subsystem generates a personalized graph for the user based on one or more text entries. In some embodiments, the scoring subsystem generates the graph including information derived from multiple text entries (e.g., multiple reviews, multiple social media posts, etc.). As an example, the text received at block 202 is a product review detected by the system in real time. The privacy monitoring system is coupled to other sites such as social media to identify other posts made by the user in other contexts. Together, this information can be used to generate the graph. Alternatively, or additionally, the scoring subsystem generates the graph using the current text entry. The graph consists of nodes in the form of the identified entities and connections between the nodes weighted according to the relationship between the entities. In some embodiments, the weights are assigned according to rules. Alternatively, machine learning is used to compute appropriate weights. Based on the connections and their weights, the scoring subsystem generates a score indicative of an overall exposure of sensitive information.

For example, when a user enters a review, the scoring subsystem creates a personalized graph of extracted entities graded by sensitivity level that produces a score for the user's review. When a user returns to the system and begins to submit another review, their graph of sensitive entities is augmented (so that entities from a previous review are linked to the new review). That way, a review is scored according to the information it reveals in isolation as well as in combination with information exposed by previous reviews.

Accordingly, in some aspects, before receiving the first set of unstructured text data (e.g., in a prior posting by the user), the content retrieval subsystem detects entry of a second set of unstructured text data entered into the input field. The content retrieval subsystem identifies, responsive to detecting the entry and with the natural language processing subsystem, a second plurality of entities associated with the private information by at least applying the trained machine learning model to the second set of unstructured text data in the input field. This second plurality of entities may represent the same, or different, entities which the user has entered in a prior post. For example, the user entered text including the entities "Main Street," "Georgia," and "neurosurgeon" in a product review on September 6. Later, on October 25, the user entered another review including the entities "Georgia," "fifth floor," and the "Diner next to my apartment building." The scoring subsystem updates the graph for the user, and computes the privacy score as a function of connections between the first plurality of entities and the second plurality of entities.

In some aspects, the weights assigned to links between the entities degrade over time. For example, links between entities in a same posting are weighted more heavily, and the weights degrade over time. As a specific example, an entity in a current post has a link weight 0.7 with another entity in the current post, a link weight of 0.5 with another entity in a post from the previous day, and a link weight of 0.1 with a post from two months ago.

In some aspects, the scoring subsystem generates the privacy score as a function of the weighted links between the entities and the sensitivity levels of the entities themselves. For example, the scoring subsystem uses the generated graph to identify the nodes and links between the nodes, and uses the corresponding weights to compute the privacy score. As a specific example, a privacy score can be computed using the function $$P = 5\sum_i W_{ei} + 3\sum_j W_{lj},$$

where P is the privacy score, $W_{ei}$ is the $i^{th}$ entity weight, and $W_{lj}$ is the $j^{th}$ link weight. In some implementations, the scoring subsystem continually updates the score as additional text is detected. For example, as the user continues to type in additional text, the privacy score is updated to reflect additional detected entities.

In some aspects, the privacy score is further used by the scoring subsystem to identify a privacy risk level (e.g., a safety grade). For example, the scoring subsystem compares the computed privacy score to one or more thresholds. If the privacy score is below a threshold, then the privacy risk level is "low;" if the privacy score is below a second threshold, then the privacy risk level is "moderate;" and if the privacy score is equal to or greater than the second threshold, then the privacy risk level is "high."

A processing device executes program code of the scoring subsystem 118 to implement block 210. In one example, the program code for the scoring subsystem 118, which is stored in a non-transitory computer-readable medium, is executed by one or more processing devices. Executing the scoring subsystem 118 causes the processing device to compute the privacy score.

At block 212, the reporting subsystem updates the graphical interface to include an indicator distinguishing a target portion of the set of unstructured text data within the input field from other portions of the set of unstructured text data within the input field. For example, the reporting subsystem updates the graphical interface by transmitting instructions to the user device (and/or an intermediate web server), thereby causing the user device to display the updated graphical interface. For example, the reporting subsystem transmits instructions causing the graphical interface to be modified to highlight the entities, show the entities in bold or other fonts, place a box around the entities, and so forth. Alternatively, or additionally, the reporting subsystem causes display of an indication of a privacy risk level (e.g., a safety grade), such as a color code and/or text. Alternatively, or additionally, the reporting subsystem transmits a signal causing the graphical interface to display text explaining the potential privacy risk posed by the flagged text data. Examples of graphical interface views displaying indicators distinguishing a target portion of the text and a privacy risk level are illustrated in FIGS. 3A-3D. In some implementations, the reporting subsystem causes display of a word cloud that delineates everything a user has disclosed collectively across posts that could be used to identify the user.

Figure 3A:
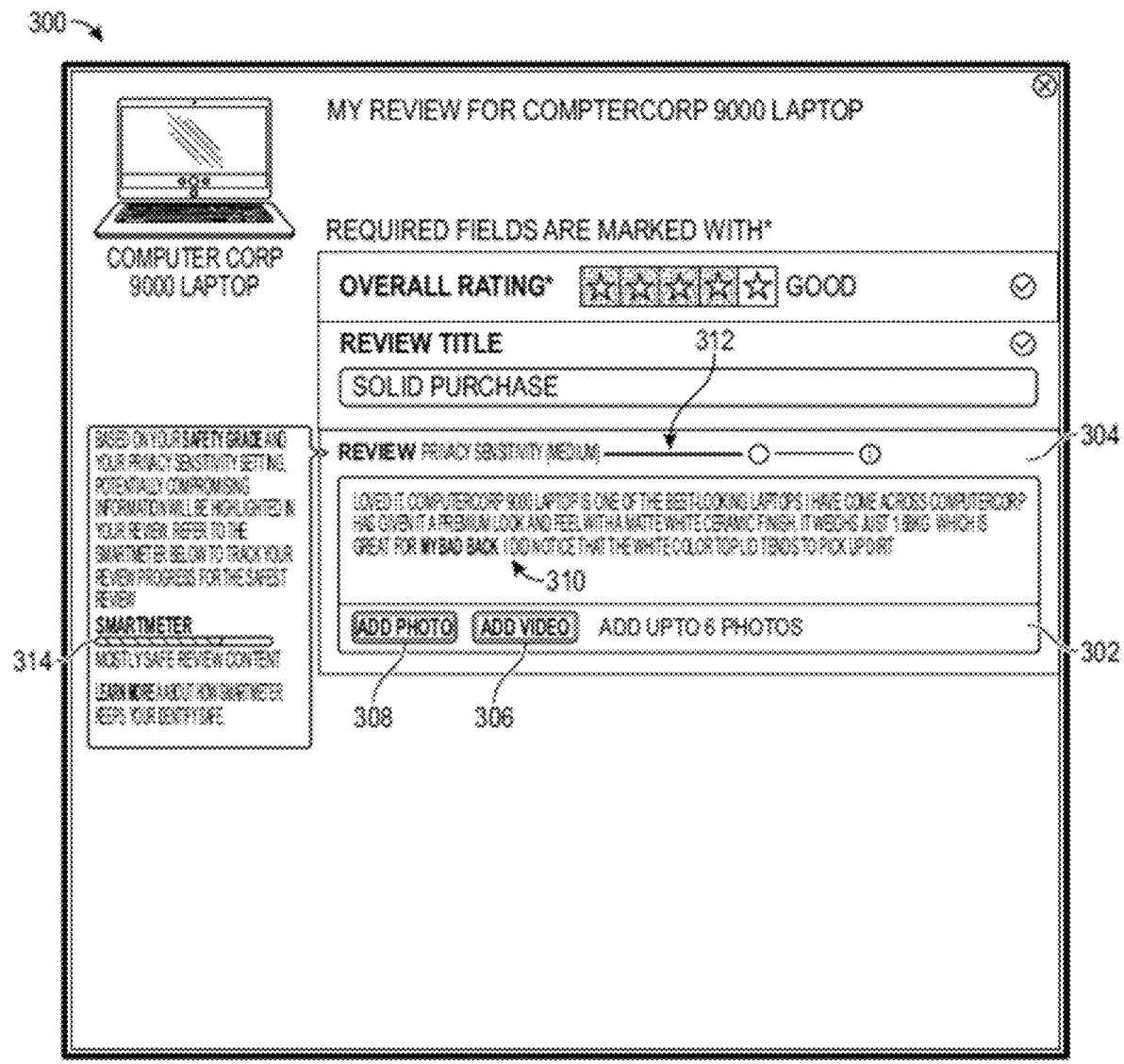
FIGS. 3A-3D illustrate an example of a sequence of graphical interfaces generated using the process depicted in FIG. 2, according to certain embodiments of the present disclosure.
Figure 3B:
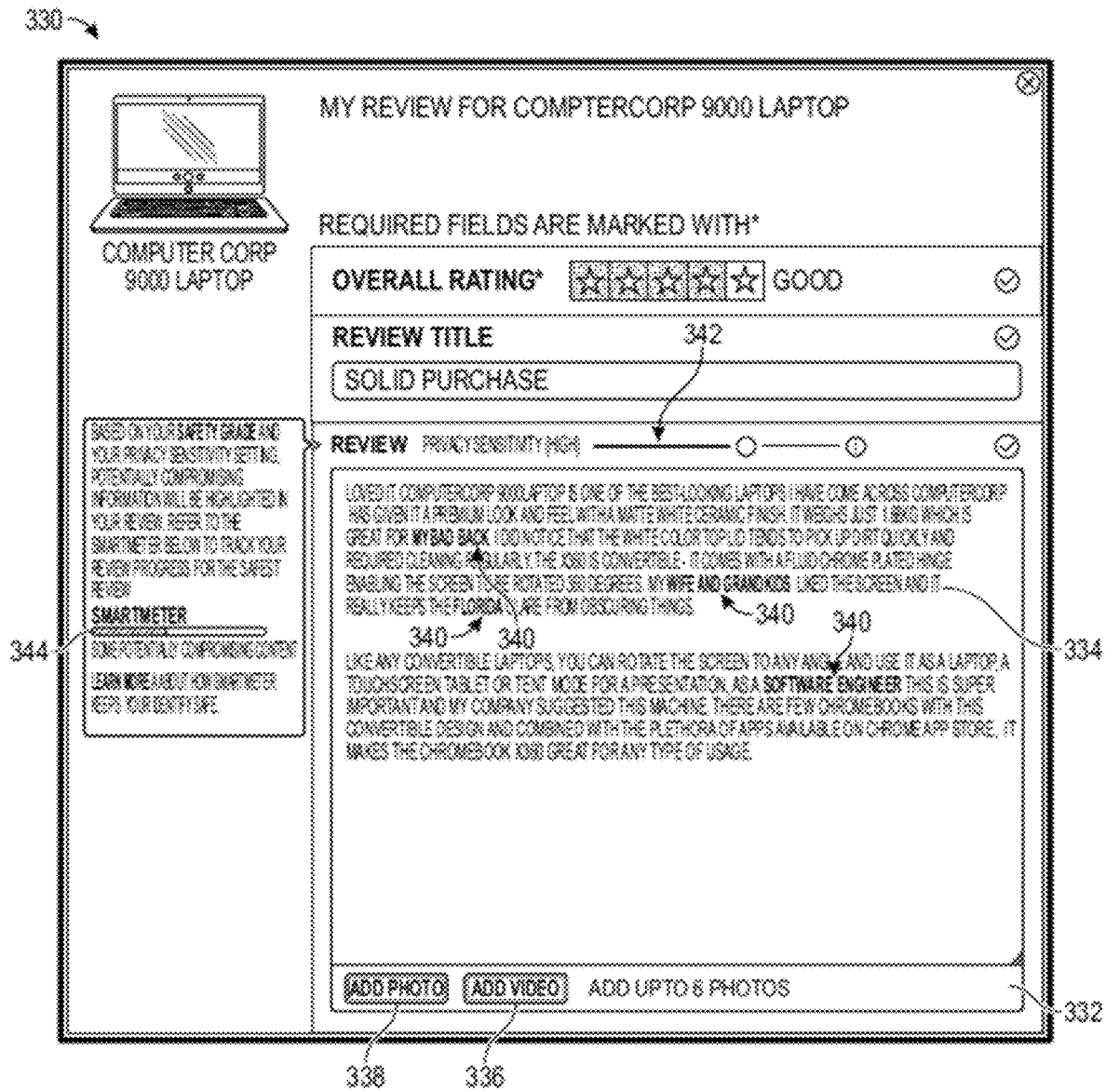
Figure 3C:
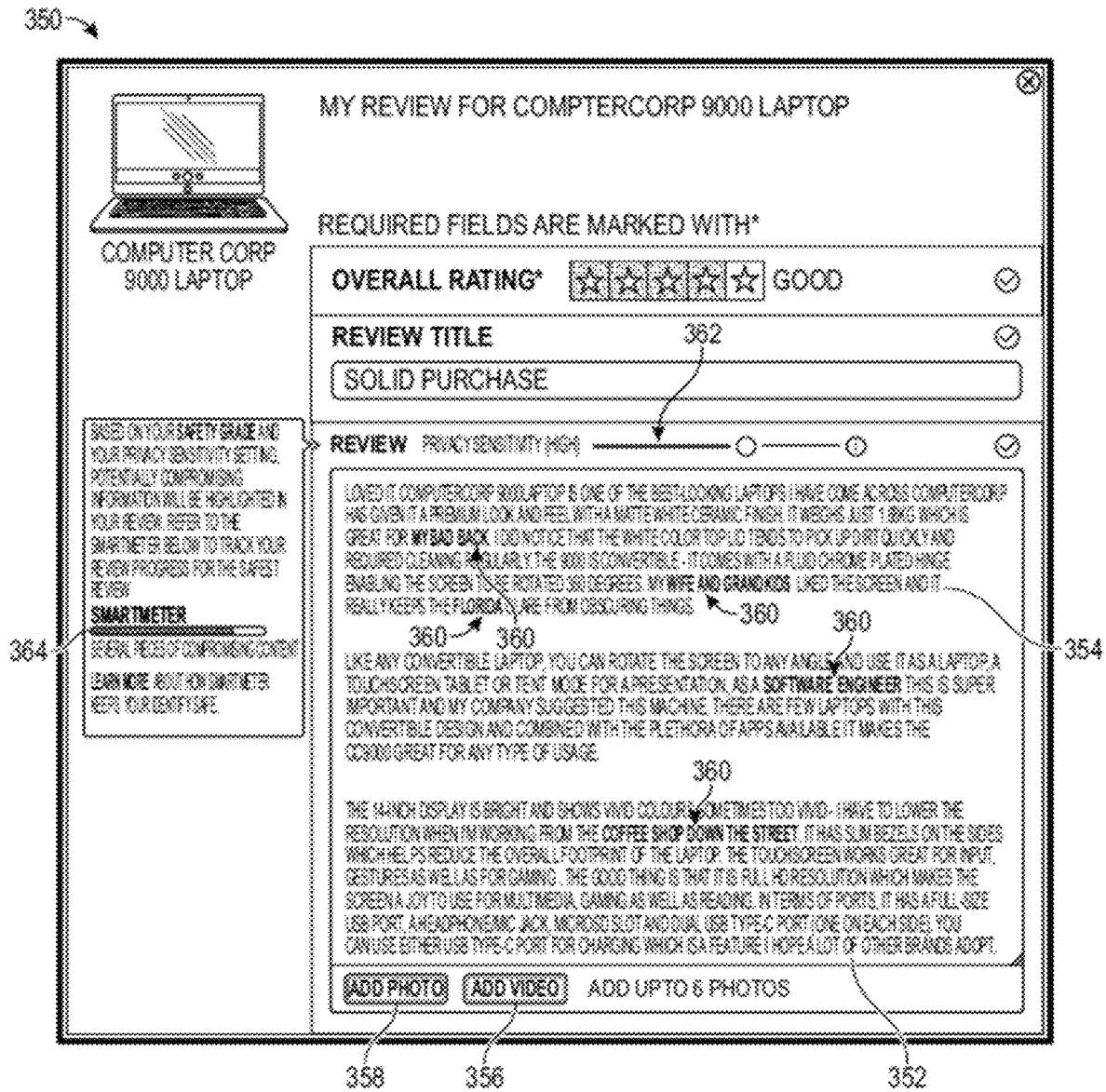

In some implementations, as illustrated in FIGS. 3A-3C, as additional text data is input by the user, additional words are highlighted and the privacy level is modified to a riskier level. Accordingly, as the user modifies the text, the privacy monitoring system dynamically repeats steps 202-212 to generate an updated privacy score and display updated or additional indicators distinguishing target portions of the text.

At block 214, a modification to the target portion changes the potential exposure of the private information indicated by the privacy score. For example, a user interacts with the graphical interface to modify the target portion. The content retrieval subsystem detects modification to the set of unstructured text data entered into the input field of the graphical interface. Responsive to detecting the modification, the natural language processing subsystem identifies a modified plurality of entities associated with private information by at least applying the trained machine learning model to the modified set of unstructured text data in the input field. The scoring subsystem computes a modified privacy score for the text data as a function of the modified entities.

Figure 3D:
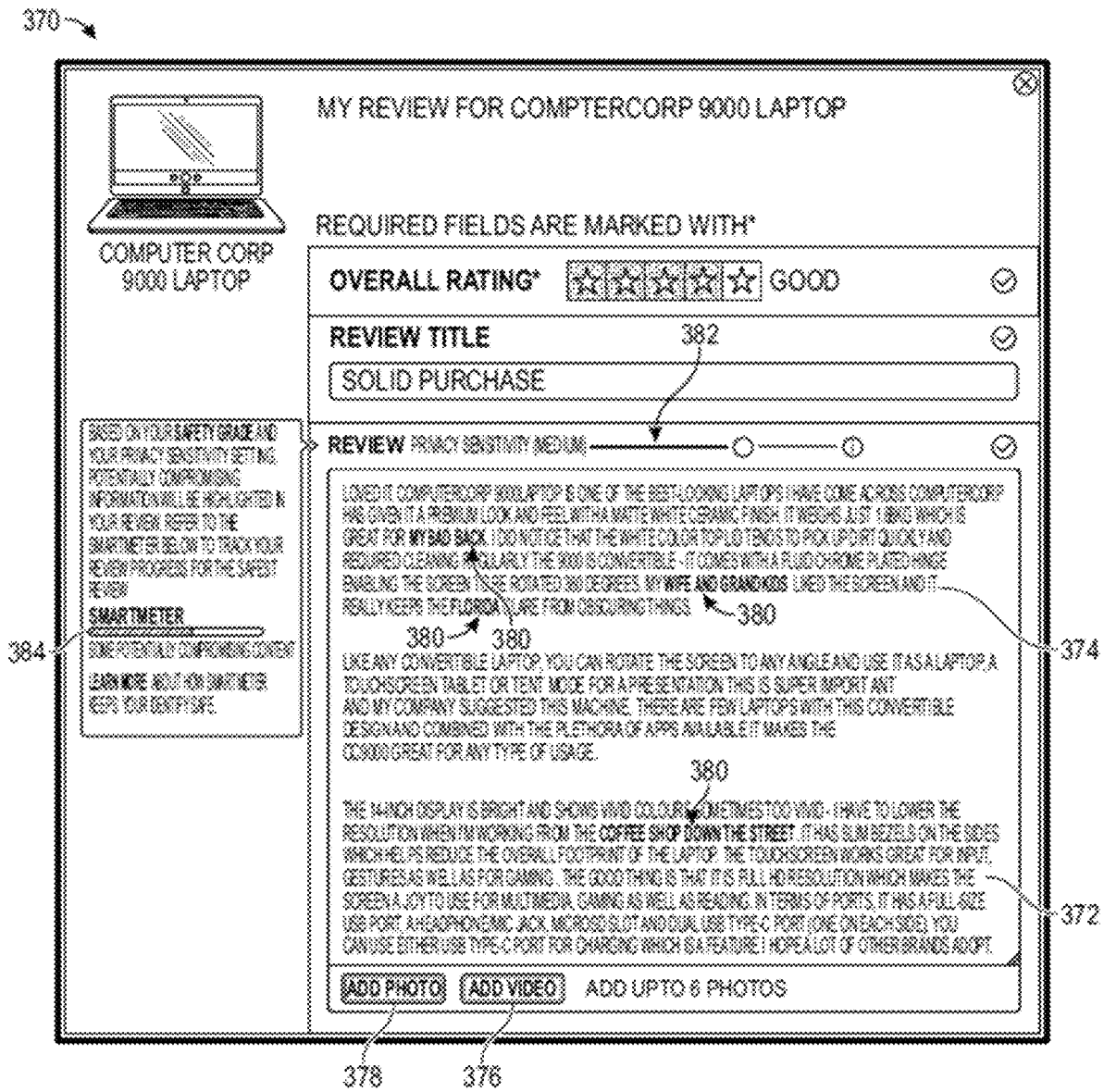

For example, responsive to the indication(s) displayed by the privacy monitoring system via the graphical interface at block 212, the user deletes or modifies a portion of the text data. As a specific example, the user deletes a phrase that has been displayed highlighted as a potential privacy risk. Accordingly, the scoring subsystem recomputes the privacy score, this time with fewer entities and links, resulting in a privacy score indicative of a lower risk level (e.g., a lower privacy score). An example of such a situation is illustrated in FIGS. 3C and 3D.

In some embodiments, the privacy monitoring system provides a content editing tool including an element for a user to provide feedback to control the sensitivity of the privacy scoring. For example, as illustrated in FIGS. 3A-3D, the graphical interface includes sliders (e.g., 312) that the user can use to control the privacy sensitivity of the model. If the privacy sensitivity is higher, then the system is more likely to generate privacy alerts. For example, if the privacy sensitivity level is increased, the models used to generate the privacy score are modified to identify more entities and/or to weight entities and links between the entities more heavily. For a lower privacy sensitivity level, certain entities are not identified as risky and/or not weighted as heavily. In some aspects, the privacy monitoring system re-executes the operations at blocks 202-210 responsive to detecting a change to such a privacy sensitivity modification element, which can result in a modified privacy score.

Based on the updated privacy score, the reporting subsystem updates the graphical interface. For example, the reporting subsystem updates the graphical interface to include fewer indicators distinguishing target portions of text data. Alternatively, or additionally, the reporting subsystem updates the graphical interface to indicate a new privacy score or privacy risk level.

Example Graphical User Interfaces With Privacy Alerts

FIGS. 3A-3D depict examples of graphical interface views 300-370 according to certain embodiments of the present disclosure. In some aspects, the graphical interface 104 includes an online content editing tool that has an edit mode in which a user can create a post (e.g., a product review, comment, etc.). The online tool further includes a "published" mode in which the comment is available to other users (and the original user might not be able to edit it). As the text is input via the graphical interface 104, the analysis of the text described above with respect to FIG. 2 is triggered. The resulting privacy score is used to display indications of privacy risks via the graphical interface 104 as shown in graphical interface views 300-370.

FIG. 3A illustrates an example of a graphical interface view 300. The graphical interface view 300 includes a text entry field 302 in which a user has entered text 304. The graphical interface view 300 further includes a photo upload element 308 (labeled "Add Photo") and a video upload element 306 (labeled "Add Video"). As the user enters the text 304 to the text entry field 302, the privacy monitoring system generates a privacy score in real time as described above with respect to FIG. 2. In the example shown in FIG. 3A, the privacy score is used by the privacy monitoring system to identify a privacy risk level. In this case, there is one phrase highlighted as a potential privacy risk 310-"my bad back." The privacy monitoring system causes this text to be highlighted to show the user content that the user could potentially wish to remove or modify. Since there is only one risky phrase in the text 304, the privacy risk level 314 is relatively low. This is indicated by displaying the "smart meter" in green, with the text "Mostly safe review content."

In some embodiments, the graphical interface view 300 further includes a slider 312 for accepting user feedback to control the sensitivity of the privacy scoring. Via slider 312, the user can modify a privacy sensitivity level used by the privacy monitoring system to generate the privacy score and determine whether to display alerts. The slider 312 may start with some default privacy sensitivity level (e.g., medium), which can be adjusted via user input.

FIG. 3B illustrates an example of an updated graphical interface view 330. The graphical interface view 330 includes a text entry field 332 in which a user has entered text 334. The graphical interface view 330 further includes a photo upload element 338 (labeled "Add Photo") and a video upload element 336 (labeled "Add Video"). As the user enters the text 334 to the text entry field 332, the privacy monitoring system updates the privacy score. As the user continues to enter text, the system updates the privacy score in real time as described above with respect to FIG. 2. In the example shown in FIG. 3B, the text 334 includes four phrases highlighted as potential privacy risks 340-"my bad back," "wife and grandkids," "Florida," and "software engineer." With the addition of more phrases that are potential privacy risks, the privacy risk level 344 has increased to a moderate level. This is indicated by displaying the "smart meter" in orange, with the text "Some potentially compromising content." The graphical interface view 330 further includes a slider 342 for accepting user feedback to control the sensitivity of the privacy scoring. In this case, the selected privacy sensitivity is high, which would result in more words being highlighted and a higher privacy risk level 344, as compared to if the privacy sensitivity were medium or low, in which case certain phrases could be used without triggering a privacy warning.

FIG. 3C illustrates an example of another updated graphical interface view 350. The graphical interface view 350 includes a text entry field 352 in which a user has entered text 354. The graphical interface view 350 further includes a photo upload element 358 (labeled "Add Photo") and a video upload element 356 (labeled "Add Video"). As the user enters the text 354 to the text entry field 352, the privacy monitoring system updates the privacy score in real time as described above with respect to FIG. 2. In the example shown in FIG. 3C, there are five phrases highlighted as potential privacy risks 360-"my bad back," "wife and grandkids," "Florida," "software engineer," and "coffee shop down the street." With the addition of yet another phrase that is a potential privacy risk, the privacy risk level 364 has increased to a relatively high level. This is indicated by displaying the "smart meter" in red, with the text "Several pieces of compromising content." The graphical interface view 350 further includes a slider 362 for accepting user feedback to control the sensitivity of the privacy scoring. Via slider 362, the user can modify a privacy sensitivity level used by the privacy monitoring system to generate the privacy score and determine whether to display alerts.

FIG. 3D illustrates an example of another updated graphical interface view 370. The graphical interface view 370 includes a text entry field 372 in which a user has entered text 374. The graphical interface view 370 further includes a photo upload element 378 (labeled "Add Photo") and a video upload element 376 (labeled "Add Video").

In the example illustrated in FIG. 3D, the user has removed text (including "software engineer") responsive to the high privacy risk level 364 shown in FIG. 3C. Accordingly, the privacy monitoring system has recomputed the privacy score based on the updated text 374, resulting in a lowered privacy risk level 384 which is displayed in the graphical interface view 370. In the example shown in FIG. 3D, there are four phrases highlighted as potential privacy risks 380-"my bad back," "wife and grandkids," "Florida," and "coffee shop down the street." With the removal of a phrase that is a potential privacy risk, the privacy risk level 384 has decreased back to the moderate level. This is indicated by displaying the "smart meter" in orange, with the text "Some potentially compromising content." The graphical interface view 370 further includes a slider 382 for accepting user feedback to control the sensitivity of the privacy scoring. Via slider 382, the user can modify a privacy sensitivity level used by the privacy monitoring system to generate the privacy score and determine whether to display alerts.

Examples of Operations for Training a Machine Learning Model

Figure 4:
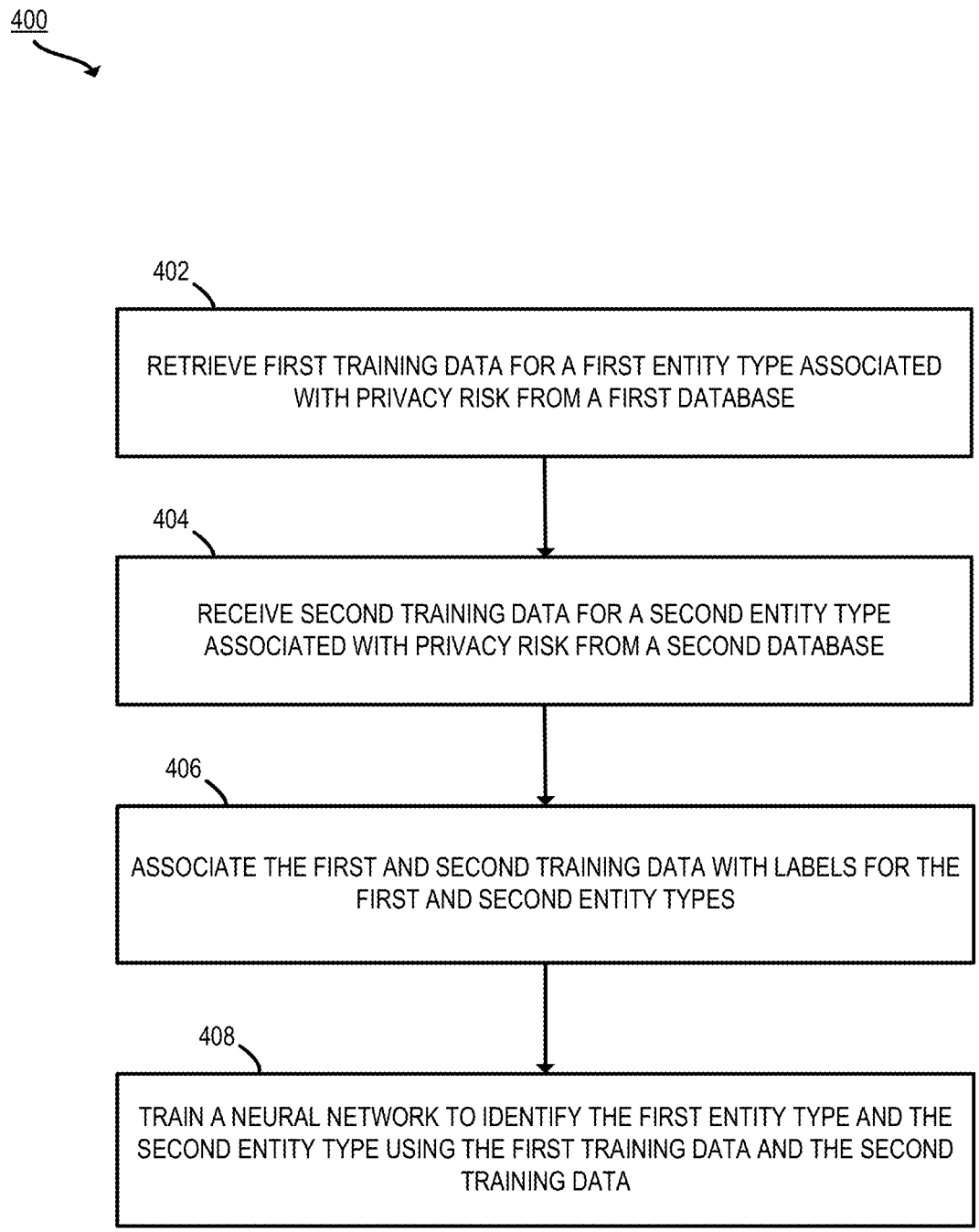
FIG. 4 depicts an example of a process for training a machine learning model as used in the process of FIG. 2, according to certain embodiments of the present disclosure.

FIG. 4 depicts an example of a process 400 for training a machine learning model as used in the process of FIG. 2, according to certain embodiments. In this example, the training subsystem 122 of the privacy monitoring system 110 retrieves training data from multiple databases (e.g., data storage unit 124A, data storage unit 124B, etc.). The training subsystem 122 trains a machine learning model to recognize different types of entities associated with a privacy risk, and this machine learning model can be used at block 208 of FIG. 2 to identify entities associated with private information. In some embodiments, one or more processing devices implement operations depicted in FIG. 4 by executing suitable program code. For illustrative purposes, the process 400 is described with reference to certain examples depicted in the figures. Other implementations, however, are possible.

At block 402, the training subsystem retrieves first training data for a first entity type associated with privacy risk from a first database. For example, data storage unit 124A stores a list of email addresses. Other examples of types of entities that can be retrieved from a particular database include health conditions (e.g., retrieved from a health advice website), names of people, names of countries, names of streets, addresses, and so forth.

At block 404, the training subsystem receives second training data for a second entity type associated with privacy risk from a second database. The training subsystem may receive the second training data in a substantially similar fashion as receiving the first training data at block 402. However, in some cases, the second training data is associated with a different entity type and come from a different database (e.g., the first training data is a list of medical conditions from a medical website, and the second training data is a list of email addresses from an online directory).

At block 406, the training subsystem associates the first and second training data with labels for the first and second entity types. In some embodiments, the training subsystem labels the first training data according to the named entity type of the overall dataset (e.g., "email address," "employer," "nearby landmark," etc.). In some cases, the training subsystem labels the second training data according to another named entity type for that respective dataset.

In some aspects, the training subsystem identifies datasets which are already grouped by a certain entity type, such as name, email address, street, medical condition, and so forth. In some embodiments, the training subsystem automatically associates each element in this data set with a label identifying the data element as of the respective type. In this fashion, the label is already associated with the entity type in the data set, and each entity need not be individually analyzed and labeled, which is a time-consuming process often used to generate training data.

In some aspects, a curated set of entities is labeled at varying levels of sensitivity. Entities related to medical, health and financial information are labeled at the highest level of sensitivity. Another set of entities can then be labeled at a medium level of sensitivity (example: those related to demographic and geolocation). This entity labeling can be done in a coarse, high, medium, and low or at a finer level of gradation.

At block 408, the training subsystem trains the machine learning model (e.g., a neural network) to identify the first entity type and the second entity type using the first training data and the second training data. In some implementations, the machine learning model is trained using backpropagation. For example, the machine learning model receives training data as input and outputs a predicted result. This result is compared to the label assigned to that training data. In some implementations, the comparison is performed by determining gradients based on the input and predicted result (e.g., by minimizing a loss function by computing and minimizing a loss value representing an error between the predicted result and the actual label value). The computed gradient is then used to update parameters of the machine learning model.

Alternatively, or additionally, the training subsystem trains the model to recognize a format associated with private information. For example, the model is trained to recognize _____@_____.com and _____@_____.org as email addresses, and to recognize _____ St. and Ave. as street names.

In some aspects, the machine learning model is trained on curated datasets of text of varying degrees of sensitivity. For instance, curated datasets of text related to personal financial information, medical, and health-related information would be classified at the highest level of sensitivity. These sensitive textual datasets would then be used to train a model to detect entities prominent in these curated sets. The curated set of named entities that reflects various degrees of sensitivity either in isolation or in combination with other entities is used to train the model to detect their usage and to score the sensitivity of the review provided by the user.

A processing device executes program code of the training subsystem 122 to implement blocks 402-408. For example, the program code for the training subsystem 122, which is stored in a non-transitory computer-readable medium, is executed by one or more processing devices. Executing the code of the training subsystem 122 causes the processing device to access the training data 126A-126N from the same non-transitory computer-readable medium or a different non-transitory computer-readable medium. In some embodiments, accessing the training data involves communicating, via a data bus, suitable signals between a local non-transitory computer-readable medium and the processing device. In additional or alternative embodiments, accessing the training data involves communicating, via a data network, suitable signals between a computing system that includes the non-transitory computer-readable medium and a computing system that includes the processing device.

Example of a Computing System for Real Time Privacy Breach Prediction

Figure 5:
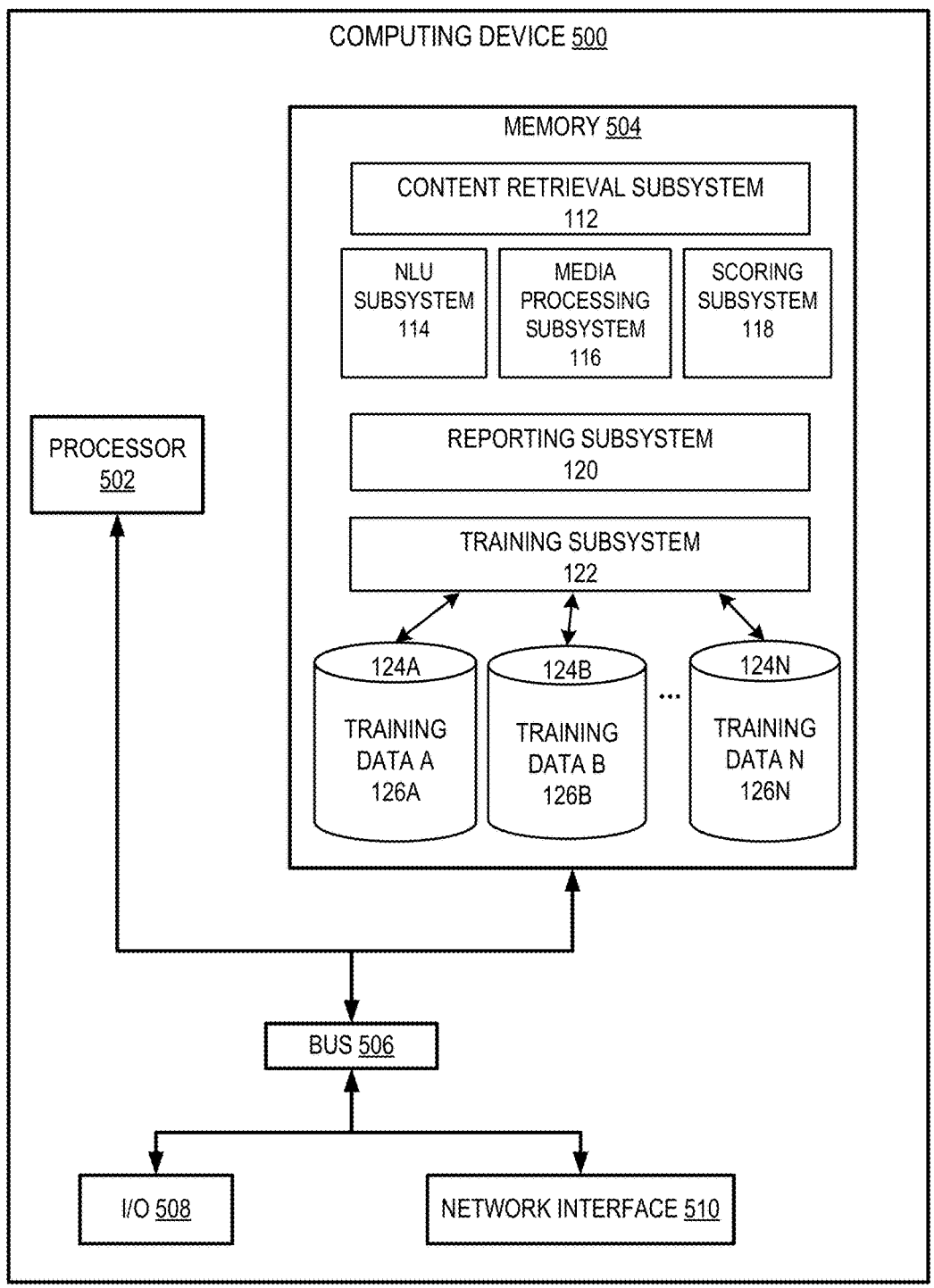
FIG. 5 depicts an example of a computing system that performs certain operations described herein, according to certain embodiments of the present disclosure.

Any suitable computing system or group of computing systems can be used for performing the operations described herein. For example, FIG. 5 depicts examples of computing system 500 that executes a scoring subsystem 118. In some embodiments, the computing system 500 also executes the content retrieval subsystem 112, NLP subsystem 114, media processing subsystem 116, reporting subsystem 120, and/or training subsystem 122 as depicted in FIG. 1. In other embodiments, a separate computing system having devices similar to those depicted in FIG. 5 (e.g., a processor, a memory, etc.) executes one or more of the subsystems 112-122.

The depicted examples of a computing system 500 includes a processor 502 communicatively coupled to one or more memory devices 504. The processor 502 executes computer-executable program code stored in a memory device 504, accesses information stored in the memory device 504, or both. Examples of the processor 502 include a microprocessor, an application-specific integrated circuit ("ASIC"), a field-programmable gate array ("FPGA"), or any other suitable processing device. The processor 502 can include any number of processing devices, including a single processing device.

The memory device 504 includes any suitable non-transitory computer-readable medium for storing data, program code, or both. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript.

The computing system 500 may also include a number of external or internal devices, such as input or output devices. For example, the computing system 500 is shown with one or more input/output ("I/O") interfaces 508. An I/O interface 508 can receive input from input devices or provide output to output devices. One or more buses 506 are also included in the computing system 500. The bus 506 communicatively couples one or more components of a respective one of the computing system 500.

The computing system 500 executes program code that configures the processor 502 to perform one or more of the operations described herein. The program code includes, for example, the content retrieval subsystem 112, NLP subsystem 114, or other suitable applications that perform one or more operations described herein. The program code may be resident in the memory device 504 or any suitable computer-readable medium and may be executed by the processor 502 or any other suitable processor. In some embodiments, both the content retrieval subsystem 112 and the NLP subsystem 114 are stored in the memory device 504, as depicted in FIG. 5. In additional or alternative embodiments, one or more of the content retrieval subsystem 112 and the NLP subsystem 114 are stored in different memory devices of different computing systems. In additional or alternative embodiments, the program code described above is stored in one or more other memory devices accessible via a data network.

The computing system 500 can access one or more of the training data A 126A, training data B 126B, and training data N 126N in any suitable manner. In some embodiments, some or all of one or more of these data sets, models, and functions are stored in the memory device 504, as in the example depicted in FIG. 5. For example, a computing system 500 that executes the training subsystem 122 can access training data A 126A stored by an external system.

In additional or alternative embodiments, one or more of these data sets, models, and functions are stored in the same memory device (e.g., one of the memory device 504). For example, a common computing system, such as the privacy monitoring system 110 depicted in FIG. 1, can host the content retrieval subsystem 112 and the scoring subsystem 118 as well as the training data 126A. In additional or alternative embodiments, one or more of the programs, data sets, models, and functions described herein are stored in one or more other memory devices accessible via a data network.

The computing system 500 also includes a network interface device 510. The network interface device 510 includes any device or group of devices suitable for establishing a wired or wireless data connection to one or more data networks. Non-limiting examples of the network interface device 510 include an Ethernet network adapter, a modem, and the like. The computing system 500 is able to communicate with one or more other computing devices (e.g., a computing device executing a graphical interface 104 as depicted in FIG. 1) via a data network using the network interface device 510.

Figure 6:
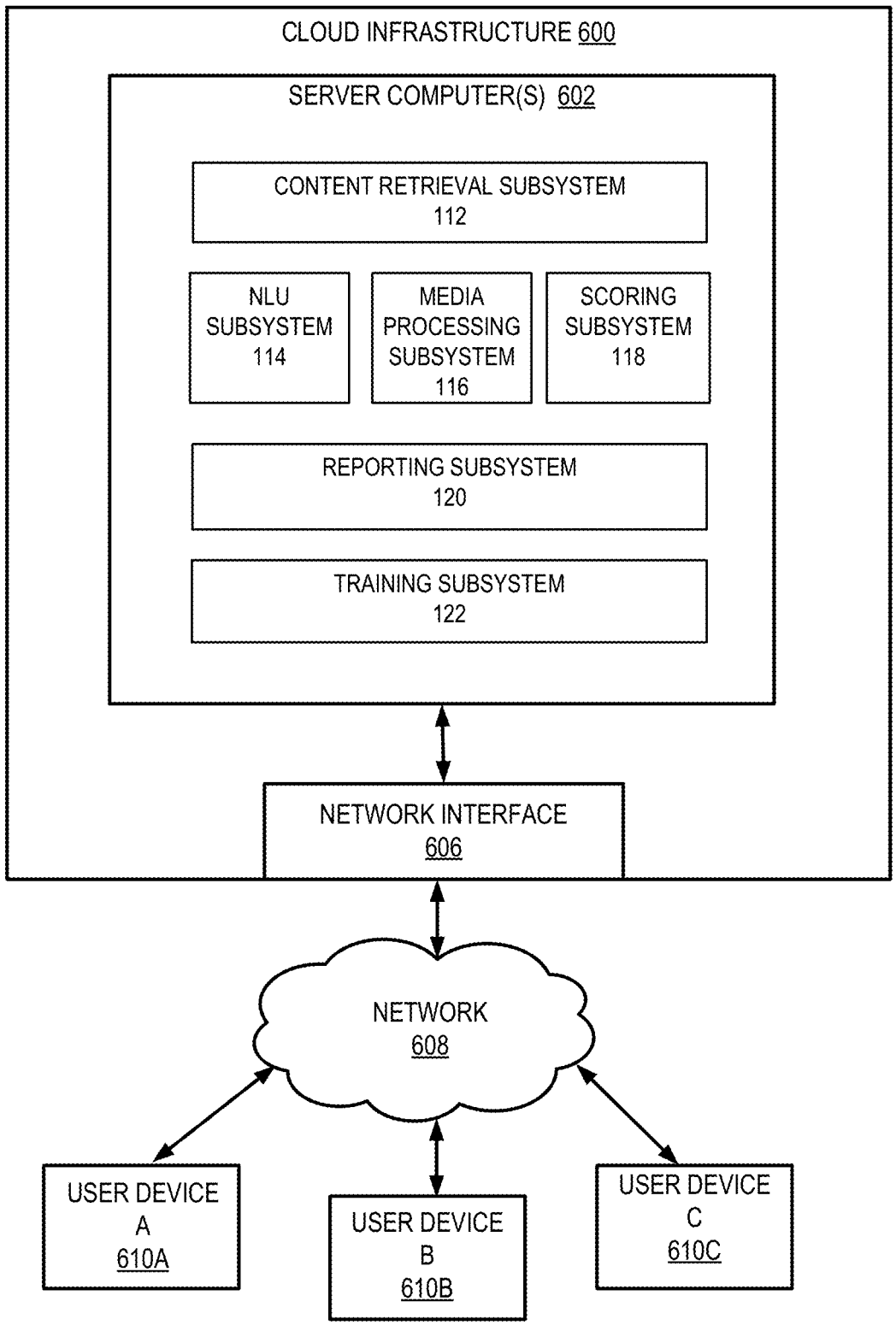
FIG. 6 depicts an example of a cloud computing environment that performs certain operations described herein, according to certain embodiments of the present disclosure.

In some embodiments, the functionality provided by the computing device 500 may be offered via a cloud-based service provided by a cloud infrastructure 600 provided by a cloud service provider. For example, FIG. 6 depicts an example of a cloud infrastructure 600 offering one or more services including a service that offers virtual object functionality as described in this disclosure. Such a service can be subscribed to and used by a number of user subscribers using user devices 610A, 610B, and 610C across a network 608. The service may be offered under a Software as a Service (SaaS) model. One or more users may subscribe to such as service.

In the embodiment depicted in FIG. 6, the cloud infrastructure 600 includes one or more server computer(s) 602 that are configured to perform processing for providing one or more services offered by the cloud service provider. One or more of server computer(s) 602 may implement a content retrieval subsystem 112, NLP subsystem 114, media processing subsystem 116, scoring subsystem 118, reporting subsystem 120, and/or training subsystem 122 as depicted in FIG. 1. The subsystems 112-122 may be implemented using software only (e.g., code, program, or instructions executable by one or more processors provided by cloud infrastructure 600), in hardware, or combinations thereof. For example, one or more of the server computer(s) 602 may execute software to implement the services and functionalities provided by subsystems 112-122, where the software, when executed by one or more processors of the server computer(s) 602, causes the services and functionalities to be provided.

The code, program, or instructions may be stored on any suitable non-transitory computer-readable medium such as any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript. In various examples, the server computer(s) 602 can include volatile memory, non-volatile memory, or a combination thereof.

In the embodiment depicted in FIG. 6, cloud infrastructure 600 also includes a network interface device 606 that enables communications to and from cloud infrastructure 600. In certain embodiments, the network interface device 606 includes any device or group of devices suitable for establishing a wired or wireless data connection to the network 608. Non-limiting examples of the network interface device 606 include an Ethernet network adapter, a modem, and/or the like. The cloud infrastructure 600 is able to communicate with the user devices 610A, 610B, and 610C via the network 608 using the network interface device 606.

A graphical interface (e.g., graphical interface 104 as depicted in FIG. 1) may be displayed on each of the user devices user device A 610A, user device B 610B, and user device C 610C. A user of user device 610A may interact with the displayed graphical interface, for example, to enter text data and upload media files. In response, processing for identifying and displaying privacy alerts may be performed by the server computer(s) 602. Responsive to these alerts, the user may again interact with the graphical interface to edit the text data to address any privacy concerns.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

The invention claimed is:

1. A computer-implemented method comprising:
    detecting, by a content retrieval subsystem, entry of a set of unstructured text data entered into an input field of a graphical interface;
    identifying, responsive to detecting the entry and with a natural language processing subsystem, a plurality of entities associated with private information by at least applying a trained machine learning model to the set of unstructured text data in the input field;
    determining, by the natural language processing subsystem, entity types for the identified entities; and
    based on the determined entity types, assigning, by a scoring subsystem, weights to links between entities in a graph model;
    computing, by the scoring subsystem, a privacy score for the text data by identifying connections between the entities, the connections between the entities contributing to the privacy score according to a cumulative privacy risk, wherein the privacy score is based on the weights, the privacy score indicating potential exposure of the private information by the set of unstructured text data; and
    updating, by a reporting subsystem in real time, the graphical interface to include an indicator distinguishing a target portion of the set of unstructured text data within the input field from other portions of the set of unstructured text data within the input field, wherein a modification to the target portion changes the potential exposure of the private information indicated by the privacy score.

2. The method of claim 1, further comprising:
    detecting, by the content retrieval subsystem, modification to the set of unstructured text data entered into the input field of the graphical interface;
    identifying, responsive to detecting the modification and with the natural language processing subsystem, a modified plurality of entities associated with private information by at least applying the trained machine learning model to the modified text data in the input field;

computing, by the scoring subsystem, a modified privacy score for the text data based on the modified entities; and updating, by a reporting subsystem, the graphical interface based on the modified privacy score.

3. The method of claim 1, further comprising:

receiving, by the content retrieval subsystem, an image or video in association with the unstructured text data; and processing, by a media processing subsystem, the image or video to identify metadata, wherein at least a subset of the identified metadata is further input to the machine learning model to identify the entities.

4. The method of claim 1, wherein the set of unstructured text data is a first set of unstructured text data and the plurality of entities is a first plurality of entities, the method further comprising:

before receiving the first set of unstructured text data:

detecting, by the content retrieval subsystem, entry of a second set of unstructured text data entered into the input field; and identifying, responsive to detecting the entry and with the natural language processing subsystem, a second plurality of entities associated with the private information by at least applying the trained machine learning model to the second set of unstructured text data in the input field, wherein the scoring subsystem computes the privacy score based on connections between the first plurality of entities and the second plurality of entities.

5. The method of claim 1, wherein the updated graphical interface further displays an indication of the privacy score.

6. The method of claim 1, wherein the machine learning model includes a neural network, the method further comprising training the neural network by:

retrieving, by a training subsystem, first training data for a first entity type associated with privacy risk from a first database;

retrieving, by the training subsystem, second training data for a second entity type associated with privacy risk from a second database; and training, by the training subsystem, the neural network to identify the first entity type and the second entity type using the first training data and the second training data.

7. A computing system comprising:

a content retrieval subsystem configured to detect entry of unstructured text data into an input field of a graphical interface;

a natural language processing subsystem configured to identify a plurality of entities associated with private information by at least applying a trained machine learning model to unstructured text data and determine entity types for the identified entities;

a scoring subsystem configured to assign weights to links between entities in a graph model based on the determined entity types and compute a privacy score for the text data by applying a graph model to the plurality of entities to identify connections between the entities, the connections between the entities contributing to the privacy score according to a cumulative privacy risk, wherein the privacy score is based on the weights, the privacy score indicating potential exposure of the private information by the unstructured text data; and a reporting subsystem configured to update the graphical interface in real time to include an indicator distinguishing a target portion of the unstructured text data within the input field from other portions of the unstructured text data within the input field, the target portion causing the potential exposure of the private information indicated by the privacy score.

8. The computing system of claim 7, wherein:

the content retrieval subsystem is further configured to detect modification to text data entered into the input field of the graphical interface;

the natural language processing subsystem is further configured to identify, responsive to detecting the modification, a modified plurality of entities associated with private information by at least applying the trained machine learning model to the modified text data in the input field;

the scoring subsystem is further configured to compute a modified privacy score for the text data based on the modified entities; and the reporting subsystem is further configured to update the graphical interface based on the modified privacy score.

9. The computing system of claim 7, wherein the content retrieval subsystem is further configured to receive an image or video in association with the unstructured text data;

further comprising a media processing subsystem configured for processing the image or video to identify metadata, wherein at least a subset of the identified metadata is further used to identify the entities.

10. The computing system of claim 7, wherein:

the text data is a first set of unstructured text data and the plurality of entities is a first plurality of entities, the content retrieval subsystem is further configured to, before receiving the first set of unstructured text data, receive a second set of unstructured text data;

the natural language processing subsystem is further configured to process the second set of unstructured text data to identify a second plurality of entities associated with the private information using the trained machine learning model; and the privacy score is computed based on connections between the first plurality of entities and the second plurality of entities.

11. The computing system of claim 7, wherein the updated graphical interface further displays an indication of the privacy score.

12. The computing system of claim 7, wherein:

the machine learning model includes a neural network; and the computing system further includes a training subsystem configured to train the neural network by:

retrieving first training data for a first entity type associated with privacy risk from a first database;

retrieving second training data for a second entity type associated with privacy risk from a second database; and training the neural network to identify the first entity type and the second entity type using the first training data and the second training data.

13. A non-transitory computer-readable medium having instructions stored thereon, the instructions executable by a processing device to perform operations comprising:

detecting entry of a set of unstructured text data entered into an input field of a graphical interface;

a step for computing a privacy score for the text data indicating potential exposure of private information by the set of unstructured text data, including determining entity types for identified entities, and based on the determined entity types, assigning weights to links between entities in a graph model, wherein the privacy score is based on the weights; and updating, based on the privacy score in real time, an indicator distinguishing a target portion of the set of unstructured text data within the input field from other portions of the set of unstructured text data within the input field.

14. The non-transitory computer-readable medium of claim 13, the operations further comprising:

detecting modification to the set of unstructured text data entered into the input field of the graphical interface;

a step for computing a modified privacy score for the text data; and updating the graphical interface based on the modified privacy score.

15. The non-transitory computer-readable medium of claim 13, the operations further comprising:

receiving an image or video in association with the unstructured text data; and processing the image or video to identify metadata, wherein at least a subset of the identified metadata is further used to compute the privacy score.

16. The non-transitory computer-readable medium of claim 13, wherein the set of unstructured text data is a first set of unstructured text data, the operations further comprising:

before receiving the first set of unstructured text data, detecting entry of a second set of unstructured text data entered into the input field;

wherein the privacy score is computed based on the first set of unstructured text data and the second set of unstructured text data.

17. The non-transitory computer-readable medium of claim 13, wherein the updated input field further displays an indication of the privacy score.

18. The non-transitory computer-readable medium of claim 13, wherein the step for computing the privacy score includes using a neural network to identify entities that contribute to the privacy score, the operations further comprising training the neural network by:

retrieving first training data for a first entity type associated with privacy risk from a first database;

retrieving second training data for a second entity type associated with privacy risk from a second database; and training the neural network to identify the first entity type and the second entity type using the first training data and the second training data.

* * * * *